US009025480B2

(12) United States Patent
Ren

(10) Patent No.: US 9,025,480 B2
(45) Date of Patent: May 5, 2015

(54) METHOD AND APPARATUS FOR SELECTING MODULATION AND CODING SCHEME

(75) Inventor: Tianmin Ren, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 230 days.

(21) Appl. No.: 13/639,871

(22) PCT Filed: Feb. 16, 2011

(86) PCT No.: PCT/CN2011/071017
§ 371 (c)(1),
(2), (4) Date: Oct. 8, 2012

(87) PCT Pub. No.: WO2012/013031
PCT Pub. Date: Feb. 2, 2012

(65) Prior Publication Data
US 2013/0051270 A1 Feb. 28, 2013

(30) Foreign Application Priority Data

Jul. 30, 2010 (CN) .......................... 2010 1 0241609

(51) Int. Cl.
*H04L 1/00* (2006.01)
*H04B 1/10* (2006.01)
*H04L 1/20* (2006.01)

(52) U.S. Cl.
CPC ............ *H04L 1/0009* (2013.01); *H04B 1/1027* (2013.01); *H04L 1/0003* (2013.01); *H04L 1/0019* (2013.01); *H04L 1/20* (2013.01); *H04L 1/0025* (2013.01)

(58) Field of Classification Search
CPC ... H04L 1/0009; H04L 1/0025; H04L 1/0019; H04L 1/20; H04L 1/0003; H04B 1/1027

USPC ......... 370/241, 252, 310, 328, 329, 431, 437, 370/464, 465; 455/403, 422.1, 450, 452.1
See application file for complete search history.

(56) References Cited

U.S. PATENT DOCUMENTS 7,885,678 B2 2/2011 You et al.
7,899,486 B2 3/2011 You et al.
(Continued)

FOREIGN PATENT DOCUMENTS

CN 101207461 A 6/2008
CN 101217526 A 7/2008
(Continued)

OTHER PUBLICATIONS

International Search Report in international application No. PCT/CN2011/071017, mailed on May 26, 2011.
(Continued)

*Primary Examiner* — Obaidul Huq
(74) *Attorney, Agent, or Firm* — Oppedahl Patent Law Firm LLC

(57) ABSTRACT

The disclosure provides a method and an apparatus for selecting a modulation and coding scheme (MCS). According to the interference plus noise power of a measuring sub-frame, a receiver adjusts the range of an average Carrier to Interference Plus Noise Ratio (CINR) in a reference MCS parameter; according to the average interference plus noise power of the measuring sub-frame in a predetermined period, the receiver calculates and obtains the average CINR in the predetermined period; based on the calculated and obtained average CINR in the predetermined period, the receiver determines MCS information by comparing the adjusted range of the average CINR. Thus the influence of the channel condition changes on the dynamic MCS selection is eliminated.

8 Claims, 3 Drawing Sheets

(56) References Cited

U.S. PATENT DOCUMENTS

| | | | |
|---|---|---|---|
| 8,300,716 B1 * | 10/2012 | Lee et al. | 375/260 |
| 8,681,888 B1 * | 3/2014 | Lee et al. | 375/260 |
| 2005/0201295 A1 * | 9/2005 | Kim et al. | 370/241 |
| 2006/0094372 A1 | 5/2006 | Ahn et al. | |
| 2007/0265026 A1 | 11/2007 | You | |
| 2008/0076438 A1 * | 3/2008 | Chang et al. | 455/452.2 |
| 2009/0010211 A1 | 1/2009 | Sumasu et al. | |
| 2009/0135892 A1 | 5/2009 | Kwak | |
| 2010/0159921 A1 * | 6/2010 | Choi et al. | 455/425 |
| 2010/0331036 A1 | 12/2010 | You et al. | |
| 2011/0038272 A1 * | 2/2011 | Hadad et al. | 370/252 |

FOREIGN PATENT DOCUMENTS

| | | | |
|---|---|---|---|
| CN | 101346913 A | 1/2009 | |
| CN | 101444015 A | 5/2009 | |
| CN | 101483501 A | 7/2009 | |
| CN | 101635608 A | 1/2010 | |
| JP | 2002199033 A | 7/2002 | |
| JP | 2004064797 A | 2/2004 | |
| JP | 2004274103 A | 9/2004 | |
| JP | 2007281780 A | 10/2007 | |
| JP | 2007325142 A | 12/2007 | |
| JP | 2008503144 A | 1/2008 | |
| JP | 2009124393 A | 6/2009 | |
| KR | 20080097507 A | 11/2008 | |

OTHER PUBLICATIONS

English Translation of the Written Opinion of the International Search Authority in international application No. PCT/CN2011/071017, mailed on May 26, 2011.

Supplementary European Search Report in European application No. 11811733.2, mailed on Jan. 13, 2015. (10 pages—see entire document).

Fan C et al: "Research on Threshold Adjustment Algorithm in Adaptive Modulation and Coding", Journal of China Universities of Posts and Telecommunications, XX, CN, vol. 13, No. 2, Jun. 1, 2006. (5 pages—see Supplementary European Search Report in European application No. 11811733.2 for relevant pages).

* cited by examiner

METHOD AND APPARATUS FOR SELECTING MODULATION AND CODING SCHEME

TECHNICAL FIELD

The present disclosure relates to the field of communication technology, specifically to a method and an apparatus for selecting a Modulation and Coding Scheme (MCS).

BACKGROUND

Typical wireless communication channels, which change randomly, are featured with frequency selectivity and time variation. The random change of the communication channels should be taken into consideration when designing wireless communication systems, and this randomness can be utilized by superior designs to improve the system performance and capability. One important thought is to change a transmission rate by adjusting an MCS dynamically according to real-time channel quality. The technology of dynamic MCS selection, which is a key technology for 3G, 4G and even future wideband wireless communications, has been broadly applied in the field of 3G and 4G is wideband wireless communications such as Long Term Evolution (LTE), Worldwide Interoperability for Microwave Access (WiMax), and etc.

The technology of dynamic MCS selection requires a transmitter (e.g. a base station) to have real-time channel quality information which can be obtained after being fed back by a receiver (e.g. User Equipment (UE)).

Since there is a certain time delay from the moment when a receiver estimates a channel and selects an MCS to the moment when a transmitter uses a fed-back MCS, the channel conditions at the moment when the transmitter uses the fed-back MCS are different from the channel conditions at the moment when the receiver selects the MCS. The difference is caused by channel changes and interference, therefore, in the existing technical conditions, the MCS fed back by the receiver is not applicable to the channel conditions at the moment when the transmitter performs transmission.

SUMMARY

The technical problem to be solved by the present disclosure is to provide a method and an apparatus for selecting an MCS to perform pre-estimation when a receiver selects an MCS, thus eliminating the influence of channel condition changes on dynamic MCS selection.

In order to solve the technical problem above, the present disclosure provides the following solutions.

An embodiment of the present disclosure provides a method for selecting an MCS, including:

adjusting a range of an average Carrier to Interference Plus Noise Ratio (CINR) in a reference MCS parameter by a receiver according to interference plus noise power of a measuring sub-frame;

calculating and obtaining an average CINR in a predetermined period by the receiver according to average interference plus noise power of the measuring sub-frame in the predetermined period; and determining MCS information by the receiver by comparing the adjusted range of the average CINR based on the calculated and obtained average CINR in the predetermined period.

Preferably, in the method above, the step of adjusting a range of an average Carrier to Interference Plus Noise Ratio (CINR) in a reference MCS parameter by a receiver according to interference plus noise power of a measuring sub-frame may include:

obtaining the interference plus noise power p(n) of the measuring sub-frame by the receiver;

calculating and obtaining an average value P(n) and variance V(n) of the interference plus noise power p(n) of the measuring sub-frame in the predetermined period by the receiver;

calculating and obtaining an pre-estimated adjustment amount of the range of the average CINR in the reference MCS parameter by the receiver according to the average value P(n) and the variance V(n); and adjusting the range of the average CINR in the reference MCS parameter by the receiver according to the pre-estimated adjustment amount.

Preferably, in the method above, the step of calculating and obtaining an average value P(n) of the interference plus noise power p(n) of the measuring sub-frame in the predetermined period by the receiver may be performed according to a following formula:

$$P(n) = \begin{cases} p(n) & n = 0 \\ (1-\alpha) \cdot P(n-1) + \alpha \cdot p(n) & n > 0 \end{cases}$$

wherein a value range of the parameter $\alpha$ is (0, 1); and the step of calculating and obtaining variance V(n) of the interference plus noise power p(n) of the measuring sub-frame in the predetermined period by the receiver may be performed according to a following formula:

$$V(n) = \begin{cases} (p(n) - P(n))^2 & n = 0 \\ (1-\alpha) \cdot V(n-1) + \alpha \cdot (p(n) - P(n))^2 & n > 0 \end{cases}$$

wherein a value range of the parameter $\alpha$ is (0, 1).

Preferably, in the method above, the step of calculating and obtaining an pre-estimated adjustment amount of the range of the average CINR in the reference MCS parameter by the receiver according to the average value P(n) and the variance V(n) may include:

calculating and obtaining normalized signal power variance B(n) by the receiver according to the average value P(n) and the variance V(n) of the interference plus noise power p(n) in the predetermined period, wherein $B(n)=V(n)/P(n)2$; and calculating and obtaining the pre-estimated adjustment amount $\Delta(n)$ of the range of the average CINR in the reference MCS parameter by the receiver according to the normalized signal power variance, wherein $\Delta(n)=f(B(n))$, and $f(\ )$ is an increasing function.

Preferably, in the method above, the step of calculating and obtaining an average CINR in a predetermined period by the receiver according to average interference plus noise power of the measuring sub-frame in the predetermined period may be performed according to a following formula:

average CINR$(n)$=10 log 10$(C/P(n))$ wherein the C is signal power.

Preferably, after the MCS information is determined, the method may further include:

feeding back the determined MCS information to a transmitter by the receiver.

An embodiment of the present disclosure further provides an apparatus for selecting an MCS. The apparatus includes: an adjusting module, a calculating module and a determining module; wherein the adjusting module is configured to, according to interference plus noise power of a measuring sub-frame, adjust a range of an average CINR in a reference MCS parameter;

the calculating module is configured to, according to average interference plus noise power of the measuring sub-frame in a predetermined period, calculate and obtain the average CINR in the predetermined period; and the determining module is configured to, based on the average CINR in the predetermined period, which is calculated and obtained by the calculating module, determine MCS information by comparing the range of the average CINR adjusted by the adjusting module.

Preferably, in the apparatus above, the adjusting module may include: an obtaining unit, a first calculating unit, a second calculating unit and an adjusting unit; wherein the obtaining unit is configured to obtain the interference plus noise power p(n) of the measuring sub-frame;

the first calculating unit is configured to calculate and obtain an average value P(n) and variance V(n) of the interference plus noise power p(n) of the measuring sub-frame in the predetermined period;

the second calculating unit is configured to, according to the average value P(n) and the variance V(n), which are calculated and obtained by the first calculating unit, calculate and obtain a pre-estimated adjustment amount of the range of the average CINR in the reference MCS parameter; and the adjusting unit is configured to, according to the pre-estimated adjustment amount which is calculated and obtained by the second calculating unit, adjust the range of the average CINR in the reference MCS parameter.

Preferably, in the apparatus above, the apparatus may further include:

a feedback module, configured to feed back the MCS information determined by the determining module to a transmitter.

Preferably, the apparatus may be a receiver.

It can be seen from the method and apparatus provided by the disclosure for selecting an MCS that, according to the interference plus noise power of a measuring sub-frame, a receiver adjusts the range of an average CINR in a reference MCS parameter; according to the average interference plus noise power of the measuring sub-frame in a predetermined period, the receiver calculates and obtains the average CINR in the predetermined period; based on the calculated and obtained average CINR in the predetermined period, the receiver determines MCS information by comparing the adjusted range of the average CINR. Thus the influence of channel condition changes on dynamic MCS selection is eliminated.

DETAILED DESCRIPTION

In a method for selecting an MCS, according to embodiments of the present disclosure, in order to enable a base station to use an MCS which is applicable to channel conditions of transmission to transmit data, certain pre-estimation is performed to offset the negative influence of channel condition changes on a dynamic MCS selection mechanism when a receiver selects an MCS. More particularly, the receiver can use the interference plus noise power of a measuring sub-frame to dynamically adjust the range of an average Carrier to Interference plus Noise Ratio (CINR) in a reference MCS parameter, then use the average interference plus noise power of the measuring sub-frame in a predetermined period to calculate and obtain the average CINR in the predetermined period, and select a corresponding MCS by comparing the adjusted range of the average CINR. Thus the influence of the channel condition changes on the dynamic MCS selection is eliminated and the transmitter can use the MCS which is applicable to the channel conditions of transmission to transmit data.

To facilitate the understanding, the specific implementation process of the embodiments of the present disclosure is described below in details by taking UE as a receiver, a base station as a transmitter, and a downlink sub-frame under a Time Division Duplex (TDD) mode in LTE as a measuring sub-frame. What needs to be explained is that, the method and apparatus for selecting an MCS, which are provided by the embodiments of the present disclosure, can be applied to a plurality of working modes in the LTE and the WiMax.

The UE involved in the embodiments of the present disclosure can save a reference MCS parameter in advance, and the MCS parameter can be saved by establishing a reference MCS table. The reference MCS parameter saved in the UE can specifically include: a plurality of MCSs applied to the UE and the base station, and the range of an average CINR corresponding to each MCS, e.g. the range of an average CINR corresponding to MCSi (i is the mark of the corresponding MCS) is from $CINR_{low,i}$ to $CINR_{high,i}$; when a measured average CINRi of the measuring sub-frame falls within the range from $CINR_{low,i}$ to $CINR_{high,i}$, the MCSi is selected as the MCS which is applied by the base station when the base station transmits data.

Figure 1:
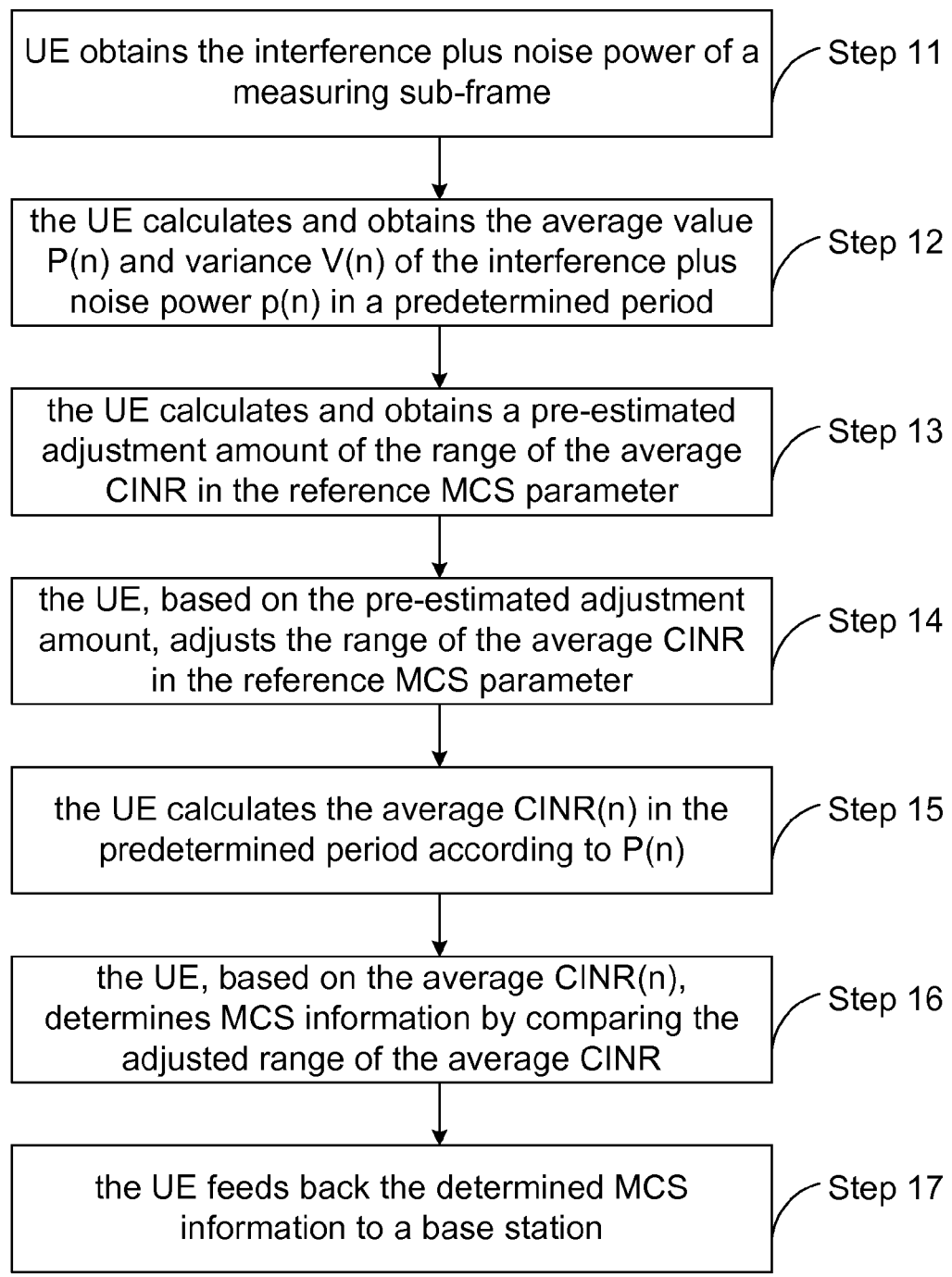
FIG. 1 is a diagram illustrating the implementation of a method for selecting an MCS according to an embodiment of the present disclosure.

FIG. 1 is a diagram illustrating the implementation of a method for selecting an MCS, according to an embodiment of the present disclosure. As shown in FIG. 1, the method for selecting an MCS according to one embodiment of the present disclosure can specifically include the following steps.

Step 11: the UE obtains the interference plus noise power of a measuring sub-frame.

More specifically, the UE can measure the interference plus noise power in each downlink sub-frame in a certain predetermined period (the period can be specifically determined by the base station), and the interference plus noise power measured in the $n^{th}$ measuring sub-frame can be recorded as p(n).

Step 12: the UE calculates and obtains an average value P(n) and variance V(n) of the interference plus noise power p(n) in the predetermined period.

More specifically, the UE maintains the average value P(n) and variance V(n) of the interference plus noise power p(n) of n measuring sub-frames (from the first to the $n^{th}$ sub-frame)

within the predetermined period. The calculation formulae of the average power P(n) and the variance V(n) of power are specifically as follows:

$$P(n) = \begin{cases} p(n) & n = 0 \\ (1-\alpha) \cdot P(n-1) + \alpha \cdot p(n) & n > 0 \end{cases}$$

$$V(n) = \begin{cases} (p(n) - P(n))^2 & n = 0 \\ (1-\alpha) \cdot V(n-1) + \alpha \cdot (p(n) - P(n))^2 & n > 0 \end{cases}$$

In the formulae above, the value range of the parameter α is (0, 1) and the value of the parameter α is preferably 0.1.

What needs to be explained is that, the average power P(n) and the variance V(n) of power which are calculated based on the formulae above are only one embodiment of the disclosure. During the specific implementation of the disclosure, those skilled in the art can certainly apply mature methods in the art to obtain the average power P(n) and the variance V(n) of power, e.g. the average power P(n) and the variance V(n) of power can be obtained by a linear average value of several measured values.

Step 13: the UE calculates and obtains a pre-estimated adjustment amount of the range of the average CINR in the reference MCS parameter.

In a preferred embodiment, firstly, the UE can calculate and obtain normalized signal power variance B(n) based on the average value P(n) and variance V(n) of the interference plus noise power p(n) of the measuring sub-frame:

$$B(n)=V(n)/P(n)2$$

and subsequently, the UE calculates and obtains the pre-estimated adjustment amount Δ(n) of the range of the average CINR in the reference MCS parameter according to the B(n):

$$\Delta(n)=f(B(n))$$

In the formula above, f( ) can be an increasing function. In the specific embodiments, f( ) can be a linear monotonic increasing function f(x)=ax, wherein a can be an integer.

The pre-estimated amount can be obtained by Step 12 and Step 13 above. What needs to be explained is that, the pre-estimated amount calculation process involved in the embodiments of the disclosure is substantially a mapping function increasing pre-estimation process which specifically can be realized by a plurality of calculation methods (including formulae, function name definitions, increasing functions, and etc.), as long as the mapping from variance of the interference plus noise power to the adjustment amount is monotonic, i.e. the larger the interference plus noise power is, the larger the adjustment amount is, i.e. the more conservative the MCS selection is.

Step 14: the UE, based on the pre-estimated adjustment amount, adjusts the range of the average CINR in the reference MCS parameter.

Based on the pre-estimated adjustment amount calculated and obtained by Step 13, the UE adjusts the range of the average CINR in the reference MCS parameter, i.e. the pre-estimated adjustment amount is added to the range of the average CINR in the reference MCS parameter.

The range of the average CINR added with the pre-estimated adjustment amount can be expressed as: $CINR_{low,i}+\Delta(n)$ to $CINR_{high,i}+\Delta(n)$.

Step 15: the UE calculates the average CINR(n) in the predetermined period according to the P(n).

Specifically, the UE can calculate the average CINR(n) of the measuring sub-frame in the predetermined period according to the formula CINR(n)=10 log 10(C/P(n)), wherein C is signal power.

Step 16: the UE, based on the average CINR(n), determines MCS information by comparing the adjusted range of the average CINR.

Specifically, the UE, based on the calculated and obtained average CINR(n), and by comparing the adjusted range of the average CINR, determines that the average CINR(n) is specifically within the adjusted range of an average CINR of an MCS, i.e. the UE determines that the MCS is an MCS which is applicable to the channel conditions of transmission performed by the base station, e.g. when the current calculated and obtained CINR(n) falls within the adjusted range of the average CINR corresponding to MCSi, then the UE determines that the MCSi is the MCS applicable to the channel conditions of transmission performed by the base station.

Step 17: the UE feeds back the determined MCS information to the base station.

The UE feeds back the determined MCS information to the base station so that the base station can select an MCS which is applicable to the channel conditions of transmission to transmit data.

The method for selecting an MCS according to the embodiments of the disclosure can be applied in different scenarios, e.g. in a multi-cell wireless communication system which applies the Multiple-Input Multiple-Output (MIMO) technology, to enable the receiver to eliminate the influence of the channel condition changes on the dynamic MCS selection and feed back the information of an MCS which is applicable to the channel conditions of transmission performed by the transmitter to the transmitter, and enable the transmitter to select an MCS applicable to the channel conditions of transmission to transmit data.

Figure 2:
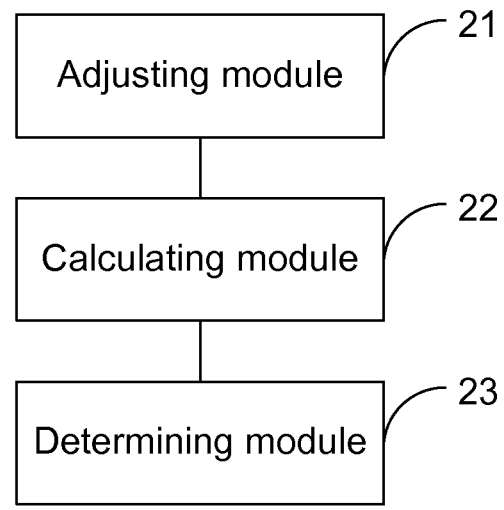
FIG. 2 is a structural diagram illustrating an apparatus for selecting an MCS according to one embodiment of the present disclosure.

FIG. 2 is a structural diagram illustrating an apparatus for selecting an MCS, according to one embodiment of the disclosure. As shown in FIG. 2, the apparatus for selecting an MCS includes:

an adjusting module 21, configured to, according to the interference plus noise power of a measuring sub-frame, adjust the range of an average CINR in a reference MCS parameter;

a calculating module 22, configured to, according to the average interference plus noise power of the measuring sub-frame in a predetermined period, calculate and obtain the average CINR in the predetermined period; and a determining module 23, configured to, based on the average CINR in the predetermined period, which is calculated and obtained by the calculating module 22, determine MCS information by comparing the range of the average CINR adjusted by the adjusting module 21.

The apparatus for selecting an MCS, according to the embodiment of the disclosure, can save the reference MCS parameter in advance, and the MCS parameter can be saved by establishing a reference MCS table. The reference MCS parameter saved in the UE can specifically include: a plurality of MCSs applied to UE and a base station, and the range of an average CINR corresponding to each MCS, e.g. the range of an average CINR corresponding to MCSi (i is the mark of the corresponding MCS) is from $CINR_{low,i}$ to $CINR_{high,i}$; when a measured average CINRi of the measuring sub-frame falls within the range from $CINR_{low,i}$ to $CINR_{high,i}$, then the MCSi is selected as the MCS which is applied by the base station when the base station transmits data.

Figure 3:
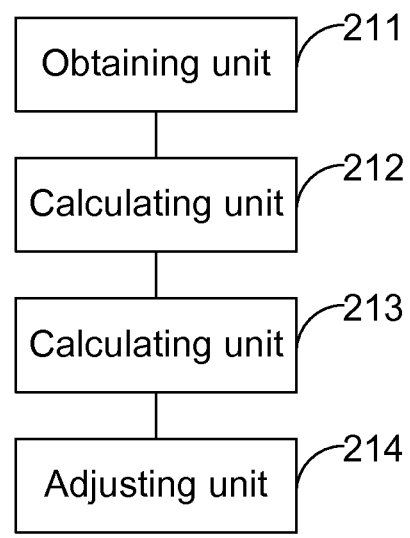
FIG. 3 is a structural diagram illustrating an adjusting module in the apparatus for selecting an MCS according to an embodiment of the present disclosure.

In a preferred embodiment, the adjusting module 21 involved in the embodiment of the disclosure can be as shown in FIG. 3 includes:

an obtaining unit 211, configured to obtain the interference plus noise power p(n) of the measuring sub-frame;

specifically, the obtaining unit 211 can measure interference plus noise power in each downlink sub-frame in a certain predetermined period (the period can be specifically determined by the base station), and the interference plus noise power measured in the $n^{th}$ measuring sub-frame can be recorded as p(n);

a calculating unit 212, configured to calculate and obtain an average value P(n) and variance V(n) of the interference plus noise power p(n) of the measuring sub-frame in the predetermined period;

specifically, the calculating unit 212 maintains the average value P(n) and variance V(n) of the interference plus noise power of measuring sub-frames (from the first to the $n^{th}$ sub-frame) within the predetermined period;

the calculation formulae of the average power P(n) and the variance V(n) of power are specifically as follows:

$$P(n) = \begin{cases} p(n) & n = 0 \\ (1-\alpha) \cdot P(n-1) + \alpha \cdot p(n) & n > 0 \end{cases}$$

$$V(n) = \begin{cases} (p(n) - P(n))^2 & n = 0 \\ (1-\alpha) \cdot V(n-1) + \alpha \cdot (p(n) - P(n))^2 & n > 0 \end{cases}$$

in the formulae above, the value range of the parameter α is (0, 1) and the value of the parameter α is preferably 0.1;

what needs to be explained is that, the average power P(n) and the variance V(n) of power which are calculated based on the formulae above are only one embodiment of the disclosure. In the specific implementation of the disclosure, those skilled in the art can certainly apply mature methods in the art to obtain the average power P(n) and the variance V(n) of power, e.g. the average power P(n) and the variance V(n) of power can be obtained by a linear average value of several measured values;

a calculating unit 213, configured to, according to the average value P(n) and variance V(n), which are calculated and obtained by the calculating unit 212, calculate and obtain a pre-estimated adjustment amount of the range of the average CINR in the reference MCS parameter;

specifically, the calculating unit 213 can firstly calculate and obtain normalized signal power variance B(n) based on the average value P(n) and variance V(n) of the interference plus noise power p(n) of the measuring sub-frame:

$$B(n) = V(n)/P(n)2$$

and subsequently, the calculating unit 213 calculates and obtains the pre-estimated adjustment amount Δ(n) of the range of the average CINR in the reference MCS parameter according to the B(n):

$$\Delta(n) = f(B(n))$$

In the formula above, f( ) can be an increasing function. In the specific embodiments, f( ) can be a linear monotonic increasing function f(x)=ax, wherein a can be an integer.

The pre-estimated amount can be obtained by the calculation performed by the calculating unit 213 in a preferred embodiment of the disclosure. What needs to be explained is that, the pre-estimated amount calculation process involved in the embodiments of the disclosure is substantially a mapping function increasing pre-estimation process which specifically can be realized by a plurality of calculation methods (including formulae, function name definitions, increasing functions, and etc.), as long as the mapping from the interference plus noise power variance to the adjustment amount is monotonic, i.e. the larger the interference plus noise power is, the larger the adjustment amount is, i.e. the more conservative the MCS selection is.

An adjusting unit 214, configured to, according to the pre-estimated adjustment amount which is calculated and obtained by the calculating unit 213, adjust the range of the average CINR in the reference MCS parameter.

Specifically, the adjusting unit 214, based on the pre-estimated adjustment amount calculated and obtained by the calculating unit 213, adjusts the range of the average CINR in the reference MCS parameter, e.g. the pre-estimated adjustment amount is added to the range of the average CINR in the reference MCS parameter.

The range of the average CINR added with the pre-estimated adjustment amount can be expressed as: $CINR_{low,i} + \Delta(n)$ to $CINR_{high,i} + \Delta(n)$.

In a preferred embodiment, the calculating module 22 involved in the embodiments of the disclosure calculates average CINR(n) in the predetermined period by the P(n).

Specifically, the calculating module 22 can calculate the average CINR(n) of the measuring sub-frame in the predetermined period according to the formula CINR(n)=10 log 10(C/P(n)), wherein C is signal power.

In a preferred embodiment, the determining module 23 involved in the embodiments of the disclosure, determines MCS information by comparing the adjusted range of the average CINR based on the average CINR(n) of the measuring sub-frame in the predetermined period, which is calculated and obtained by the calculating module 22.

Specifically, the determining module 23, based on the average CINR(n) of the measuring sub-frame in the predetermined period, which is calculated and obtained by the calculating module 22, and by comparing the adjusted range of the average CINR, determines that the average CINR(n) specifically falls within the adjusted range of an average CINR of a certain MCS, i.e. the UE determines that the MCS is used as the MCS which is applicable to the channel conditions of transmission performed by the base station, e.g. when the current calculated and obtained CINR(n) falls within the adjusted range of the average CINR corresponding to the MCSi, then the determining module 23 determines that the MCSi is the MCS applicable to the channel conditions applied of transmission performed by the base station.

Figure 4:
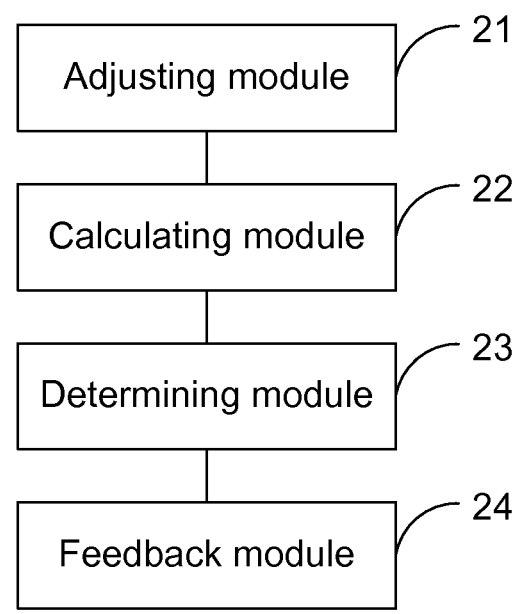
FIG. 4 is a structural diagram illustrating an apparatus for selecting an MCS according to another embodiment of the present disclosure.

In another preferred embodiment, the apparatus for selecting an MCS, which is involved in the embodiments of the disclosure, is as shown in FIG. 4, and further includes:

a feedback module 24, configured to feed back the MCS information, which is determined by the determining module 23, to a transmitter.

Specifically, the feedback module 24 feeds back the MCS information, which is determined by the determining module 23, to a base station, so that the base station can select an MCS applicable to the channel conditions of transmission to transmit data.

In a preferred embodiment, the apparatus for selecting an MCS, which is involved in the embodiments of the disclosure, can be a receiver, e.g. UE. In addition, the transmitter involved in the embodiments of the disclosure can be a base station specifically.

It can be seen from the description above that, in the method and apparatus for selecting an MCS according to the embodiments of the disclosure, the receiver adjusts the range of an average CINR in a reference MCS parameter according to the interference plus noise power of a measuring sub-frame, calculates and obtains an average CINR in a predetermined period according to the average interference plus noise power of the measuring sub-frame in the predetermined period, and determines MCS information by comparing the adjusted range of the average CINR based on the calculated and obtained average CINR in the predetermined period. Thus the influence of channel condition changes on dynamic MCS selection is eliminated, the MCS fed back can achieve the desired Block Error Rate (BLER) accurately, and the transmitter can use the MCS applicable to the channel conditions of transmission to transmit data.

What are described above are only embodiments of the disclosure. It should be pointed out that for those skilled in the art, several improvements and modifications can be made without departing from the spirit of the disclosure. These improvements and modifications should be regarded as the protection scope of the disclosure.

The invention claimed is:

1. A method for selecting a Modulation and Coding Scheme (MCS), comprising:
    adjusting a range of an average Carrier to Interference Plus Noise Ratio (CINR) in a reference MCS parameter by a receiver according to interference plus noise power of a measuring sub-frame;
    calculating and obtaining an average CINR in a predetermined period by the receiver according to average interference plus noise power of the measuring sub-frame in the predetermined period; and
    determining MCS information by the receiver by comparing the adjusted range of the average CINR based on the calculated and obtained average CINR in the predetermined period;
    wherein the step of adjusting a range of an average Carrier to Interference Plus Noise Ratio (CINR) in a reference MCS parameter by a receiver according to interference plus noise power of a measuring sub-frame comprises:
    obtaining the interference plus noise power p(n) of the measuring sub-frame by the receiver;
    calculating and obtaining an average value P(n) and variance V(n) of the interference plus noise power p(n) of the measuring sub-frame in the predetermined period by the receiver;
    calculating and obtaining an pre-estimated adjustment amount of the range of the average CINR in the reference MCS parameter by the receiver according to the average value P(n) and the variance V(n); and
    adjusting the range of the average CINR in the reference MCS parameter by the receiver according to the pre-estimated adjustment amount.

2. The method according to claim 1, wherein the step of calculating and obtaining an average value P(n) of the interference plus noise power p(n) of the measuring sub-frame in the predetermined period by the receiver is performed according to a following formula:

$$P(n) = \begin{cases} p(n) & n = 0 \\ (1-\alpha) \cdot P(n-1) + \alpha \cdot p(n) & n > 0 \end{cases}$$

wherein a value range of the parameter $\alpha$ is (0, 1); and
the calculating and obtaining variance V(n) of the interference plus noise power p(n) of the measuring sub-frame in the predetermined period by the receiver is performed according to a following formula:

$$V(n) = \begin{cases} (p(n) - P(n))^2 & n = 0 \\ (1-\alpha) \cdot V(n-1) + \alpha \cdot (p(n) - P(n))^2 & n > 0 \end{cases}$$

wherein a value range of the parameter $\alpha$ is (0, 1).

3. The method according to claim 2, further comprising: after determining the MCS information, feeding back the determined MCS information to a transmitter by the receiver.

4. The method according to claim 1, wherein the step of calculating and obtaining an pre-estimated adjustment amount of the range of the average CINR in the reference MCS parameter by the receiver according to the average value P(n) and the variance V(n) comprises:
    calculating and obtaining normalized signal power variance B(n) by the receiver according to the average value P(n) and the variance V(n) of the interference plus noise power p(n) in the predetermined period, wherein B(n)=V(n)/P(n)2; and
    calculating and obtaining the pre-estimated adjustment amount A (n) of the range of the average CINR in the reference MCS parameter by the receiver according to the normalized signal power variance, wherein
    A(n)=f(B(n)), and f( ) is an increasing function.

5. The method according to claim 4, further comprising: after determining the MCS information, feeding back the determined MCS information to a transmitter by the receiver.

6. The method according to claim 1, wherein the step of calculating and obtaining an average CINR in a predetermined period by the receiver according to average interference plus noise power of the measuring sub-frame in the predetermined period is performed according to a following formula:

average CINR(n)=10 log 10(C/P(n))

wherein the C is signal power.

7. The method according to claim 6, further comprising: after determining the MCS information, feeding back the determined MCS information to a transmitter by the receiver.

8. The method according to claim 1, further comprising: after determining the MCS information, feeding back the determined MCS information to a transmitter by the receiver.

* * * * *